United States Patent
Maiorano et al.

(10) Patent No.: US 8,741,384 B2
(45) Date of Patent: Jun. 3, 2014

(54) METHOD OF SYNTHESIZING BRANCHED GOLD NANOPARTICLES HAVING CONTROLLED SIZE AND BRANCHING

(75) Inventors: Gabriele Maiorano, S. Cesarea Terme (IT); Loris Rizzello, Lecce (IT); Shiv Shankar Sangaru, Lecce (IT); Roberto Cingolani, Arnesano (IT); Pier Paolo Pompa, Lecce (IT)

(73) Assignee: Fondazione Istituto Italiano di Tecnologia (IT)

(*) Notice: Subject to any disclaimer, the term of this patent is extended or adjusted under 35 U.S.C. 154(b) by 0 days.

(21) Appl. No.: 13/992,007

(22) PCT Filed: Dec. 6, 2011

(86) PCT No.: PCT/IB2011/055479
§ 371 (c)(1),
(2), (4) Date: Jun. 6, 2013

(87) PCT Pub. No.: WO2012/077043
PCT Pub. Date: Jun. 14, 2012

(65) Prior Publication Data
US 2013/0260033 A1    Oct. 3, 2013

(30) Foreign Application Priority Data
Dec. 6, 2010 (IT) .............................. TO2010A0968

(51) Int. Cl.
*B05D 7/14*     (2006.01)
*B05D 7/00*     (2006.01)
(52) U.S. Cl.
USPC ........................ 427/216; 427/217; 427/212
(58) Field of Classification Search
USPC .................. 427/216, 212, 214, 217
See application file for complete search history.

(56) References Cited

U.S. PATENT DOCUMENTS

2008/0266555 A1    10/2008 Murphy et al.

OTHER PUBLICATIONS

The International Search Report and Written Opinion dated Jun. 26, 2012.
Xie, et al. ":The Synthesis of SERS-active gold nanoflower tags for in vivo applications," ACS Nano, vol. 2, No. 12, Jan. 1, 2008, pp. 2473-2480.
Zhao, et al., "Formation and Stability of Gold Nanoflowers by the Seeding Approach: The Effect of Intraparticle Ripening," Journal of Physical Chemistry C, vol. 113, No. 238, Sep. 24, 2009, pp. 16645-11651.
Chen, et al., "Fabrication of Gold Nanoparticles with Different Morphologies in HEPES buffer," Rare Metals, vol. 29, No. 2, Apr. 1, 2010, pp. 180-186.
Sau, et al., "Nonspherical Noble Metal Nanoparticles: Colloid-Chemical Synthesis and Morphology Control," Advanced Materials, vol. 22, No. 16, Apr. 22, 2010, pp. 1871-1804.
Kumar, et al. Nanotechnology 2008, 19, 015606.
Wang, et al., J. Phys. Chem C. 2008, 112, 16348-16353.
Zou, et al., Nanotechnology 2006, 17 4758-4764.
XP-002657183.

*Primary Examiner* — Dah-Wei D Yuan
*Assistant Examiner* — Ngaleung V Law
(74) *Attorney, Agent, or Firm* — Thomas Horstemeyer LLP

(57) ABSTRACT

A method of synthesizing branched gold nanoparticles is described, starting from an aqueous solution of gold nanoparticle spherical seeds, which is subjected to a growth treatment with an aqueous solution comprising hydroxylamine or a salt thereof as a reducing agent and 4-(2-hydroxyethyl)-1-piperazineethanesulfonic acid (HEPES) as an agent that directs the shape of the nanostructure, and by subsequent addition of an aqueous solution of chloroauric acid ($HAuCl_4$). The structural features and the properties of the branched gold nanoparticles obtained by the method of the invention are also described.

11 Claims, 3 Drawing Sheets

Figure 1:
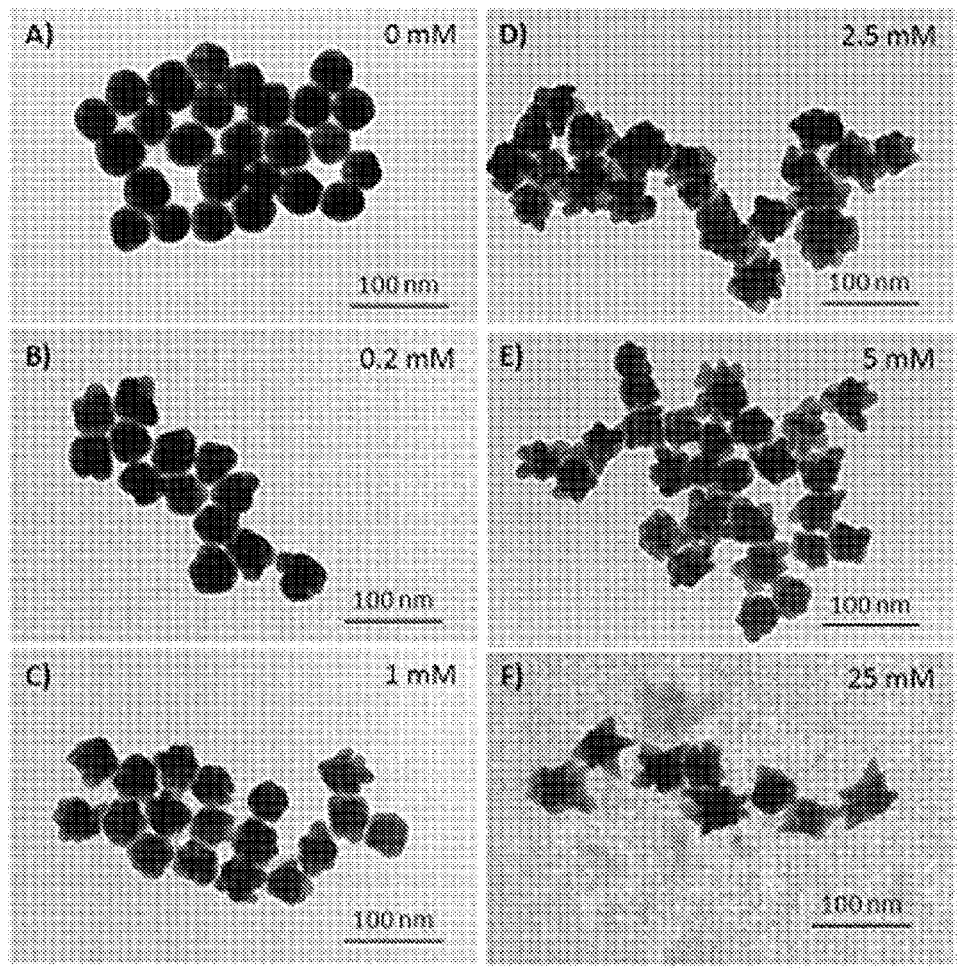

METHOD OF SYNTHESIZING BRANCHED GOLD NANOPARTICLES HAVING CONTROLLED SIZE AND BRANCHING

CROSS-REFERENCE TO RELATED APPLICATION

This application is the 35 U.S.C. §371 national stage of PCT application PCT/IB2011/055479, filed Dec. 6, 2011 which claims priority to Italian Patent Application No. TO2010A000968, dated Dec. 6, 2010, both of which are incorporated by reference in their entirety.

In the last twenty years many new nanomaterials having interesting properties have been synthesized and constructed and several novel applications have been proposed and developed for such materials. However, in order to use the novel applications commercially, it is necessary to define synthesis and construction protocols that allow to produce the nanomaterials always with a high quality.

The nanoparticle synthesizing methods available up to date, which have been defined as laboratory methods, do not allow to obtain highly pure nanoparticles having an acceptable mono-dispersion and with the possibility of adjusting at will features and properties thereof. A few metal nanoparticles have been synthesized with a good control in size and shape, including spherical, rod-like, cubic, triangular, polygonal, etc. shapes. Recently, a few synthesis protocols for branched nanoparticles characterized by a good mono-dispersion have been published in the literature.

Such nanoparticles, which are also known as nanostars, nanoflowers, nanohedgehogs, etc. or more generally nanowrinkled particles, proved to be good candidates for surface enhanced Raman spectroscopy (SERS). They can also be potentially suitable for many other applications where nanoparticles with electromagnetic radiation absorption properties within a broader range of wavelengths are required or where electromagnetic radiation absorption properties which are sensitive to any variation which may occur in or on the nanoparticle are required.

Some of the procedures described so far in the prior art for synthesizing the above-mentioned branched nanoparticles are briefly summarized hereinafter.

The patent application US 2008/0266555 A1 describes a method of synthesizing branched nanoparticles wherein to a solution of previously synthesized smaller spherical gold nanoparticles (designated as "solution of nanoparticle seeds"), a growth mixture consisting of chloraurate ions, cetyltrimethylammonium bromide and ascorbic acid in particular proportions is added, which causes growth of the branches. This synthesis approach is designated as "seed-mediated nanoparticle growth". By modifying the proportion between the nanoparticle seeds and the growth solution, nanoparticles of other shapes are obtained.

Kumar P. S. et al. (Nanotechnology 2008, 19, 015606) describe the synthesis of branched nanoparticles by seed-mediated growth, by mixing an ethanolic solution of seeds of polyvinylpyrrolidone (PVP)-coated spherical gold nanoparticles 15 nm in diameter in a solution of dimethylformamide mixed with PVP and an aqueous solution of chloroauric acid.

Xie J et al. (ACS Nano, 2008, 2, 2473-2480) demonstrated that branched nanoparticles of different sizes can be synthesized in a single step by reacting a solution of chloroauric acid with different concentrations of 4-(2-hydroxyethyl)-1-piperazineethanesulfonic acid (HEPES) in an aqueous solution. In this synthesis pathway, HEPES acts both as a reducing agent and a capping agent and as an agent that directs the shape of such nanostructures. There is no possibility of fine tuning the final size of the branched colloidal gold nanoparticles obtained. It is only described that, with an increasing proportion of HEPES compared to the gold ions, the size of the branched nanoparticles decreases.

Zhao L et al. (J. Phys. Chem. C 2009, 113, 16645-16651) demonstrated the synthesis of branched gold nanoparticles by using another seed-mediated growth approach, wherein gold nanoparticle seeds, obtained through reduction of the aurate ion by sodium citrate, are grown in a solution consisting of chloroauric acid, sodium hydroxide and hydroxylamine. It is shown that by increasing the pH of the growth solution, the branching can be controlled to a certain degree.

Wang W et al. (J. Phys. Chem. C 2008, 112, 16348-16353) demonstrated, through a single step process, that branched nanoparticles can be synthesized by reaction of chloroauric acid with ascorbic acid in the presence of chitosan. They also demonstrated that the degree of surface branching depends on the concentration of chitosan.

Zou X et al. (Nanotechnology 2006, 17 4758-4764), by employing a seed-mediated growth method, demonstrated the synthesis of branched gold nanoparticles in several steps. First of all, to an aqueous solution with varying amounts of gold nanoparticles 2.5 nm in diameter (seeds), hydroxylamine sulfate and trisodium citrate, an aqueous chloroauric acid solution was added drop-wise. The nanoparticles obtained by this first step were then employed as seeds and the reaction process was repeated in a similar way. This process was repeated four times in order to obtain in each step branched nanoparticles of different sizes.

However, the known methods for synthesizing branched gold nanoparticles, including the above-mentioned methods based on seed-mediated growth, have the disadvantage of not allowing to obtain branched nanoparticles having a satisfactory mono-dispersion, or of not showing the possibility of controlling the optical absorption properties of the nanoparticles in a broader range of wavelengths, or of not showing the possibility of simultaneously regulating the size and the degree of branching with a single synthesis step.

Many of the prior art synthesis methods also depend on the use of cetyltrimethylammonium bromide (CTAB) or other capping agent, as the surfactant that irreversibly binds to the surface of the nanoparticles. This makes them unsuitable for applications that require the particles to undergo further surface modifications with molecules having desired functional groups. Such surfactant-coated particles are also unsuitable for biological applications, as the capping agents may be cytotoxic.

It is thus an object of the present invention to provide a method of synthesizing branched gold nanoparticles which overcomes the drawbacks and limitations of the prior art.

In particular, one object of the present invention is to provide a method of synthesizing branched gold nanoparticles by which it is possible to simultaneously control the size and the degree of branching of the synthesized nanoparticles.

A further object is to provide a method of synthesizing branched gold nanoparticles which allows to obtain nanoparticles having a satisfactory mono-dispersion.

Still another object is to provide a method of synthesizing branched gold nanoparticles which allows to control, with extreme precision, the optical properties of the obtained nanoparticles, in a broad region of the UV-visible spectrum and the near-infrared.

Still another object is to provide a method of synthesizing branched gold nanoparticles which allows to obtain nanoparticles the surface of which is suitable to be subsequently modified with desired functional groups by the conventional ligand exchange methods.

Still another object is to provide a method of synthesizing branched gold nanoparticles which does not contemplate the use of cytotoxic capping agents, such as CTAB, organic thiol molecules or others.

Still another object is to provide a method of synthesizing branched gold nanoparticles which allows to obtain nanoparticles suitable to be coated with a metal oxide shell, such as for example silica or other materials, for further applications such as MEF (Metal Enhanced Fluorescence) or MEC (Metal Enhanced Chemiluminescence), wherein a certain distance between the fluorophore and the nanoparticle surface is necessary.

Still another object is to provide a method of synthesizing branched gold nanoparticles which allows to obtain nanoparticles suitable to be used, coated or not by other materials, for applications based on the SERS (Surface Enhanced Raman Scattering) phenomenon.

Still another object is to provide a method of synthesizing branched gold nanoparticles which allows to obtain nanoparticles with a finely tuned optical absorption in certain regions of the spectrum, for the therapeutic treatment of neoplastic diseases through a photo-thermal effect.

This and other objects are attained according to the present invention through a method of synthesizing branched gold nanoparticles by seed-mediated growth, characterized in that it comprises the steps of:

a) providing an aqueous solution of gold nanoparticle spherical seeds; and b) subjecting the gold nanoparticle spherical seeds to a growth treatment, characterized in that it comprises:

$b_1$) treating the aqueous solution of gold nanoparticle spherical seeds with an aqueous solution comprising hydroxylamine or a salt thereof as a reducing agent and 4-(2-hydroxyethyl)-1-piperazineethanesulfonic acid (HEPES) as a growth shape-directing agent; and $b_2$) adding an aqueous solution of aurate ions, preferably chloroauric acid ($HAuCl_4$), thereby obtaining branched gold nanoparticles by the controlled growth of branches on the surface of the gold nanoparticle spherical seeds.

The method of the invention differs from the above-mentioned prior art, in particular from what's described in Xie J et al., 2008, in that HEPES acts exclusively as an agent that directs the growth shape and not as a reducing agent. The reaction actually contemplates the use of a different and distinct reducing agent, that is hydroxylamine. Hydroxylamine is used as such or in a salt form, such as for example, but without limitation, hydroxylamine hydrochloride, hydroxylamine sulfate, or the like.

Preferred embodiments of the synthesis method of the invention form the subject of the subordinate claims, the contents of which form an integral part of the present description.

Further features and advantages of the present invention will appear from the detailed description and following examples that contain references to the appended drawings, the contents of which are illustrated hereinafter.

FIG. 1 shows representative images obtained with a transmission electron microscope (TEM) of branched gold nanoparticles having an average diameter of about 40 nm and characterized by a different degree of branching. Such nanoparticles are obtained according to the method of the invention, first of all by synthesizing seeds with a diameter of about 18 nm and then reducing thereon other gold ions, by using hydroxylamine sulfate as the reducing agent in the presence of different concentrations of HEPES. FIG. 1A corresponds to gold nanoparticle seeds grown with gold ions and hydroxylamine in the absence of HEPES, which results in the formation of spherical gold nanoparticles with a diameter of about 40 nm. FIG. 1B corresponds to gold nanoparticle seeds grown with gold ions and hydroxylamine in the presence of 0.2 mM HEPES, which results in the formation of gold nanoparticles with a diameter of about 40 nm and an irregular shape, similar to nanostars with an underdeveloped branching. FIG. 1C corresponds to gold nanoparticle seeds grown with gold ions and hydroxylamine in the presence of 1 mM HEPES, which results in the formation of gold nanoparticles with a diameter of about 40 nm and an irregular shape, similar to nanostars having very small branches/spikes. FIG. 1D corresponds to gold nanoparticle seeds grown with gold ions and hydroxylamine in the presence of 2.5 mM HEPES, which results in the formation of branched gold nanoparticles with small but distinguishable branches. FIG. 1E corresponds to gold nanoparticle seeds grown with gold ions and hydroxylamine in the presence of 5 mM HEPES, which results in the formation of branched gold nanoparticles with more distinguishable branches. FIG. 1F corresponds to gold nanoparticle seeds grown with gold ions and hydroxylamine in the presence of 25 mM HEPES, which results in the formation of branched gold nanoparticles with an evident branching.

Figure 2:
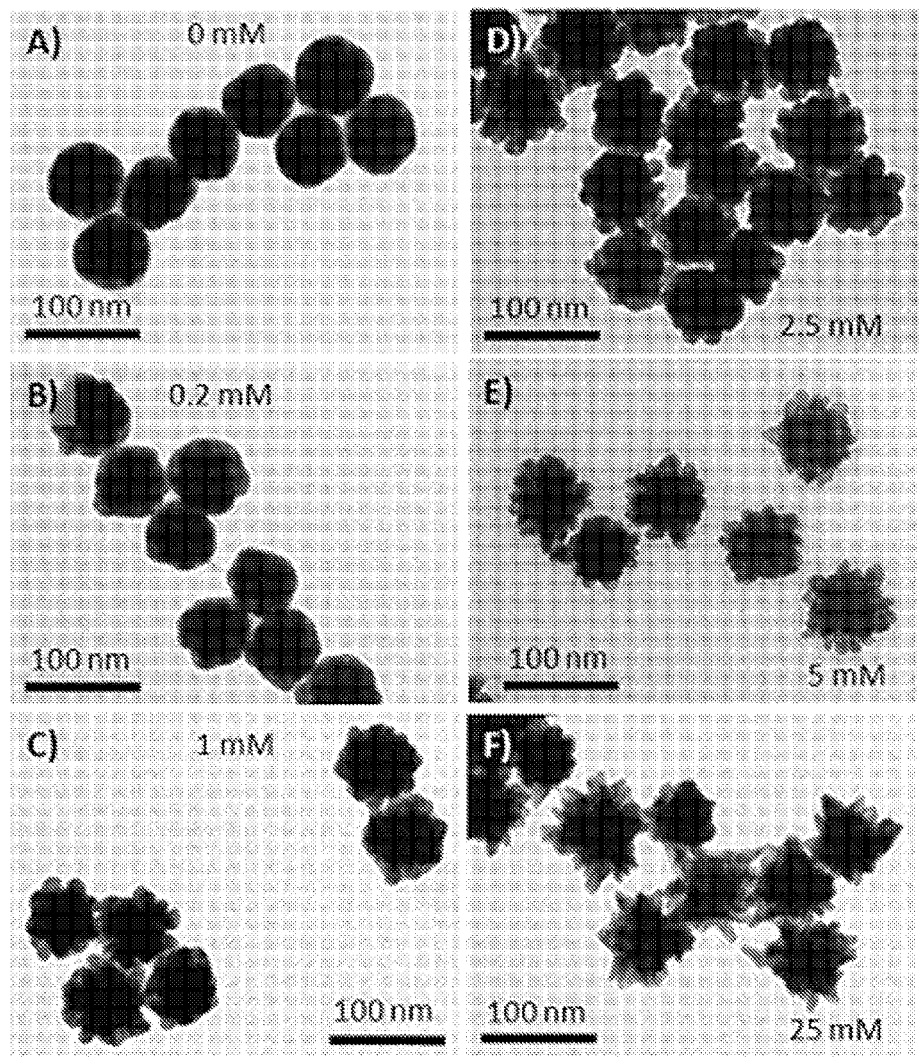

FIG. 2 shows representative images obtained with a transmission electron microscope (TEM) of gold nanoparticles having an average diameter of about 60 nm and a different degree of branching. Such nanoparticles are obtained according to the method of the invention, first of all by synthesizing seeds with a diameter of about 40 nm (prepared as indicated with reference to FIG. 1A) and then reducing thereon the same amount of gold ions as mentioned with reference to FIGS. 1A-F, by using hydroxylamine sulfate as the reducing agent in the presence of different concentrations of HEPES. FIG. 2A corresponds to gold nanoparticle seeds grown with gold ions and hydroxylamine in the absence of HEPES, which results in the formation of spherical gold nanoparticles with a diameter of about 60 nm. FIG. 2B corresponds to gold nanoparticle seeds grown with gold ions and hydroxylamine in the presence of 0.2 mM HEPES, which results in the formation of gold nanoparticles with a diameter of about 60 nm and an irregular surface, similar to nanostars with an underdeveloped branching on a spherical carrier structure.

FIG. 2C corresponds to gold nanoparticle seeds grown with gold ions and hydroxylamine in the presence of 1 mM HEPES, which results in the formation of gold nanoparticles with a diameter of about 60 nm and an irregular shape, similar to nanostars having very small branches/spikes. FIG. 2D corresponds to gold nanoparticle seeds grown with gold ions and hydroxylamine in the presence of 2.5 mM HEPES. The number of branching sites and the length of the branches are clearly increased. FIG. 2E corresponds to gold nanoparticle seeds grown with gold ions and hydroxylamine in the presence of 5 mM HEPES, which results in the formation of gold nanoparticles with a well distinguishable radial even branching on the entire surface of the nanoparticle. FIG. 2F corresponds to gold nanoparticle seeds grown with gold ions and hydroxylamine in the presence of 25 mM HEPES, which results in the formation of branched gold nanoparticles with an evident long branching.

By comparing FIG. 2 (B-C-D-E-F) with FIG. 1 (B-C-D-E-F), it can be seen that the gold nanoparticles, although they have different sizes, exhibit the same nanostructuring increase pattern, which indicates the high quality of the synthesis process.

Figure 3:
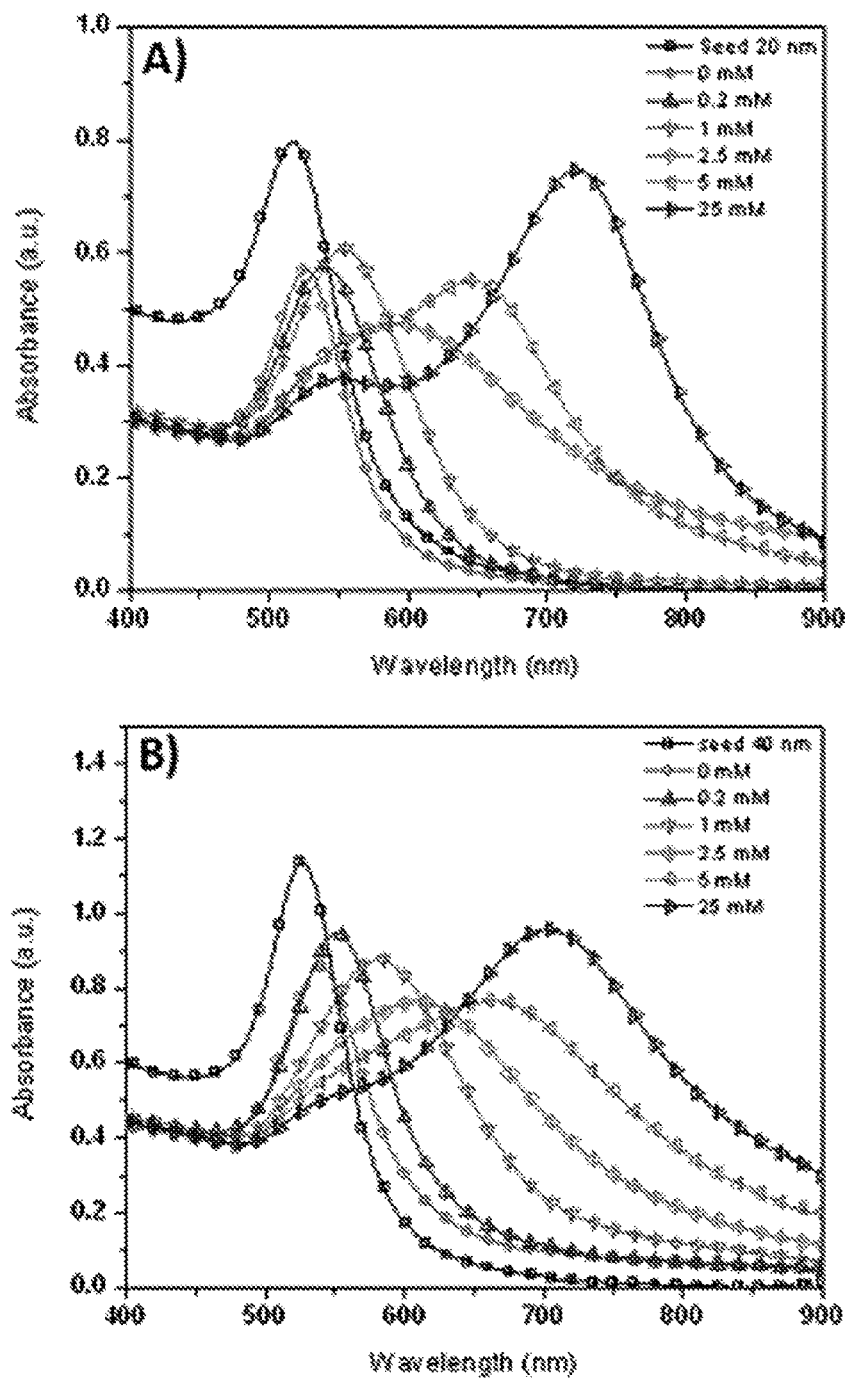

FIG. 3 shows the UV-visible absorbance spectra of gold nanoparticles with A) an average diameter of about 40 nm and B) an average diameter of about 60 nm, with a different degree of branching, corresponding to the TEM images in FIG. 1 and FIG. 2, respectively. In FIG. 3A, the 18 nm gold nanoparticle seeds have a maximum absorbance around 520 nm and their spectrum is represented by the curve designated as "seed 20 nm". After having grown more gold on the seeds, a red shift is observed, the extent of which depends on the average diameter of the obtained nanoparticles and the degree of branching. The solution of nanoparticles corresponding to FIG. 1A, which were grown up to an average diameter of 40 nm in the absence of HEPES and are thus spherical, has a minor red shift, with a maximum absorbance at 527 nm. With the appearance of an underdeveloped branching during growth (nanoparticles corresponding to FIG. 1B), the maximum absorbance of the solution shifts to about 540 nm. By increasing the amount of HEPES during the growth phase, the degree of branching increases and the maximum absorbance of the solution progressively shifts towards the red: for the solutions in FIGS. 1C, 1D, 1E, and 1F, the maximum absorbance shifts to about 555 nm, 590 nm, 650 nm, and 720 nm, respectively. The same happens for the nanoparticles in FIG. 2, which are grown starting from bigger seeds. In FIG. 3B, the solution of 40 nm gold nanoparticle seeds has a maximum absorbance at 527 nm, which is the same as FIG. 3A. By further growing these seeds in the absence of HEPES, up to a diameter of 60 nm, the maximum absorbance shifts towards 540 nm and corresponds to that of spherical gold nanoparticles with an average diameter of 60 nm, shown in FIG. 2A. The branched gold nanoparticles with an underdeveloped branching corresponding to FIG. 2B have a maximum absorbance at 552 nm. By adding increasing amounts of HEPES during the growth phase, nanoparticles are obtained which correspond to FIGS. 2C, 2D, 2E, and 2F, the maximum absorbance of which progressively shifts towards 580 nm, 610 nm, 665 nm, and 702 nm.

In accordance with the red shift observed in connection with the maximum absorbance, as the branching increases, the color of the solutions changes from red to blue-purple.

As previously mentioned, the method of synthesizing branched gold nanoparticles according to the invention advantageously allows to control both the average diameter and the branching degree on the surface, maintaining a good mono-dispersion.

According to a preferred embodiment, the branched nanoparticles are synthesized by a method comprising multiple synthesis steps, the first of which is the synthesis of the so-called seeds, the which synthesis can be carried out by any known procedure for such purpose. By way of example, the seeds are synthesized starting from an aqueous solution of gold ions, for instance in the form of chloroauric acid, which are reduced by for example trisodium citrate at the boiling temperature. Alternatively, it is possible to first mix the chloroauric acid solution with trisodium citrate at room temperature and then add a cold aqueous solution of sodium borohydride. The product of this first synthesis step is an aqueous solution of spherical-shaped gold nanoparticles having a small diameter, precisely called seeds. In the subsequent synthesis steps, a predetermined amount of seed solution is mixed with an aqueous solution of hydroxylamine as such, or in a salt form (for example hydroxylamine sulfate), and HEPES. The pH of the solution is preferably comprised between 5.0 and 9.0, more preferably it is of about 7.0. To such a solution, a further amount of gold ion solution, preferably chloroauric acid, is added drop-wise with agitation.

The branching degree of the branched nanoparticles obtained by the method of the invention is controlled by changing the amount of HEPES in the solution. In the absence of HEPES, the nanoparticles grow in size evenly in all directions, without the formation of branches on their surface, and thus they grow as spherical nanoparticles. Instead, in the presence of HEPES, the nanoparticles grow unevenly, with the formation of branched nanoparticles characterized by the presence of branching. The overall average diameter of the obtained nanoparticles is finely tuned both by the amount of gold nanoparticle seeds added into the growth solution and by the amount of aurate ions added into the said solution. Instead, the branching degree depends on the amount of HEPES used in the synthesis. In a preferred embodiment, HEPES is used in a concentration comprised between 0.1 mM and 200 mM, preferably comprised between 0.2 mM and 25 mM. The branched nanoparticles thus obtained have an overall average diameter comprised between 20 and 200 nm and an average length of the branches comprised between 4 and 60 nm. In such preferred embodiment, the obtained branched nanoparticles have a maximum absorbance in the UV-visible region comprised between 500 and 800 nm, preferably comprised between 520 and 740 nm, which depends both on the overall size and the degree of branching.

The term "branching" intends to indicate the spikes occurring on the surface of a branched nanoparticle as a result of the uneven growth of the nanoparticle itself. It has been observed that each single spike can develop in a substantially linear or branched way. The term "degree of branching" intends to indicate both the number of branching sites and the average length of the spikes, whether they are linear and/or branched.

Thanks to the pointed ends of the branches, the branched gold nanoparticles obtained by the method of the present invention are able to considerably increase the electromagnetic field that surrounds them. This property may be advantageously used for such applications as for example the surface enhanced Raman spectroscopy (SERS) for detecting trace target molecules. The increase in the local electromagnetic field also makes them suitable for such applications as fluorescence or metal enhanced fluorescence (MEF or MEC).

Another advantage of the branched gold nanoparticles obtained with the method of the invention is that they do not display strong ligands or surfactants on their surfaces, such as for example organic thiol molecules or CTAB, so they can easily be modified with suitable functional groups, ligands or biomolecules, for diagnostic, drug delivery, bioconjugation, etc., applications, which require the presence of particular functionalities on the nanoparticle surfaces, or even for the formation of autoassembled layers on the surfaces which the gold nanoparticles are able to bind to.

The branched gold nanoparticles obtained with the method of the invention also lend themselves to be coated with a metal oxide shell, such as for example silica or other metal oxides, variable in thickness, for further applications such as for example MEF (Metal Enhanced Fluorescence), wherein it is essential that there is a certain distance between the fluorophore and the nanoparticle surface.

As previously mentioned, the possibility of controlling both the overall average diameter and the branching degree by the synthesis method of the invention also allows to finely tune the optical properties of the obtained branched gold nanoparticles, including the color thereof. This makes the branched gold nanoparticles obtained by the method of the invention particularly suitable for use as dyes in specific opaque or clear materials, or for use in coatings where the use of organic dyes or metal complexes would not be appropriate.

Finally, the method of the invention can be controlled so as to result in the synthesis of branched gold nanoparticles having a high extinction coefficient and a broad absorbance spectrum in the red and near-infrared regions, which makes them excellent candidates for use in hyperthermal treatments of cancerous tissues (better than the gold nanorods) by using local laser irradiation for killing the cancerous cells targeted by such nanostructures, through specific bioconjugation techniques. As the branched gold nanoparticles obtained with the method of the invention may have a high extinction coefficient and a broad absorbance spectrum in the red and near-infrared regions, lasers with a broader range of wavelengths can be used for an effective local photothermal effect, that is around the nanoparticle.

The following examples are provided solely by way of illustration and not limitation of the scope of the invention as defined in the appended claims.

EXAMPLES

Example 1

Small-Sized Highly Branched Nanoparticles

Gold nanoparticles of about 18 nm were synthesized first by boiling 150 ml of 0.25 mM aqueous $HAuCl_4$ solution, followed by addition of 2.6 ml of 1% trisodium citrate solution, then the solution was allowed to gently boil for 30 minutes and finally slowly cooled down. A wine red color appeared. These nanoparticles were used as seeds for a further growth with development of branching. To that end, 0.8 ml of the 18 nm seed solution were diluted with the necessary amount of water and then 0.3 ml of 40 mM $NH_2OH$ and 0.75 ml of 1 M HEPES solution (pH 7.0) were added, to have a final volume of 25 ml. To this solution, 5 ml of 1 mM aqueous $HAuCl_4$ solution were added drop-wise, which caused a change in the color of the solution and the formation of branched gold nanoparticles, about 40 nm in diameter, having a maximum absorbance at about 720 nm, as confirmed by Dynamic Light Scattering (DLS), transmission electron microscopy (TEM), and UV-Visible spectroscopy.

Example 2

Big-Sized Highly Branched Nanoparticles

Gold nanoparticles of about 18 nm were synthesized as described in Example 1.

In order to increase the diameter thereof, about 8 ml of 18 nm seed solution were added to a 150 ml growth solution of water with 1 ml of 40 mM hydroxylamine sulfate and without HEPES molecules. To this solution 20 ml of 1 mM $HAuCl_4$ solution were added drop-wise, with vigorous continuous stirring, which resulted in the growth of the nanoparticles up to a final diameter of about 40 nm, but without growth of branching (spherical nanoparticles). The reaction solution was stirred further for 30 minutes and finally trisodium citrate in a final concentration of 1 mM was added, as a mild stabilizing agent for the surface of such nanostructures. These nanoparticles were used as seeds for a further growth with development of branching. To that end, the solution containing the 40 nm seeds was concentrated by centrifuging, so as to use the same amount of seeds (in the final volume) as that used for the synthesis of Example 1. 0.8 ml of this 40 nm seed solution were diluted with the necessary amount of water and then 0.3 ml of 40 mM $NH_2OH$ and 0.75 ml of 1 M HEPES solution (pH 7.0) were added, to have a final volume of 25 ml. To this solution, 5 ml of 1 mM aqueous $HAuCl_4$ solution were added drop-wise, leading to a change in the color of the solution and the formation of branched gold nanoparticles, about 60 nm in diameter, having a maximum absorbance at about 702 mm, as confirmed by DLS, TEM, and UV-Visible spectroscopy.

Example 3

Small-Sized Nanoparticles with Underdeveloped Branching

Gold nanoparticles of about 18 nm were synthesized first by boiling 150 ml of 0.25 mM aqueous $HAuCl_4$ solution, followed by addition of 2.8 ml of 1% trisodium citrate solution, then the solution was allowed to gently boil for 30 minutes and finally slowly cooled down. A wine red color appeared. These nanoparticles were used as seeds for obtaining branched nanoparticles with underdeveloped branching. To that end, 0.8 ml of the 18 nm seed solution were diluted with the necessary amount of water, followed by addition of 0.3 ml of 40 mM $NH_2OH$ and 6 µl of 1 M HEPES solution (pH 7.0), to obtain a final volume of 25 ml. To this solution, 5 ml of 1 mM aqueous $HAuCl_4$ solution were added drop-wise, leading to a change in the color of the solution and the formation of branched gold nanoparticles about 40 nm in diameter with a poorly developed branching, having a maximum absorbance at about 540 nm, as confirmed by DLS, TEM, and UV-Visible spectroscopy.

Example 4

Big-Sized Nanoparticles with Underdeveloped Branching

Gold nanoparticles of about 18 nm were synthesized as described in Example 3.

In order to obtain bigger-sized branched gold nanoparticles, firstly the seeds of about 18 nm were increased in diameter, without the generation of branching. To that end, about 8 ml of 18 nm seed solution were added to a 150 ml growth solution of water, to which about 1 ml of 40 mM hydroxylamine sulfate was added. To this solution, 20 ml of 1 mM $HAuCl_4$ solution were added drop-wise, with vigorous continuous stirring, which led to the spherical growth of the nanoparticles up to a final diameter of about 40 nm. The reaction solution was stirred further for 30 minutes and finally trisodium citrate in a final concentration of 1 mM was added, as a mild stabilizing agent for the surface of such nanostructures. These nanoparticles were used as seeds for the further growth of branched nanoparticles with underdeveloped branching. However, before the growth step, the 40 nm seeds were concentrated by centrifuging, so as to use the same amount of seeds (in the final volume) as that used in Example 1. 0.8 ml of this 40 nm seed solution were diluted into the necessary amount of water, followed by addition of 0.3 ml of 40 mM $NH_2OH$ and 6 µl of 1 M HEPES solution (pH 7.0), so as to have a final volume of 25 ml. To this solution, 5 ml of 1 mM aqueous $HAuCl_4$ solution were added drop-wise, leading to a change in the color and the formation of branched nanoparticles with underdeveloped branching, having a maximum absorbance at about 550 nm, as confirmed by DLS, TEM, and UV-Visible spectroscopy.

Example 5

Small-Sized Gold Nanoparticles with an Intermediate Branching Degree

Gold nanoparticles of about 18 nm were synthesized as described in Example 3.

These nanoparticles were used as seeds for growing them further bigger and obtaining an intermediate branching degree. 0.8 ml of this 18 nm seed solution were diluted with the necessary amount of water, followed by addition of 0.3 ml of 40 mM $NH_2OH$ and 75 µl of 1 M HEPES solution (pH 7.0), to have a final volume of 25 ml. To this solution, 5 ml of 1 mM aqueous $HAuCl_4$ solution were added drop-wise, leading to a change in the color of the solution and the formation of branched gold nanoparticles about 40 nm in diameter with an intermediate branching, and having a maximum absorbance at about 590 nm, as confirmed by DLS, TEM, and UV-Visible spectroscopy.

Example 6

Big-Sized Gold Nanoparticles with an Intermediate Branching Degree

Gold nanoparticles of about 18 nm were synthesized as described in Example 3.

In order to obtain bigger-sized gold nanoparticles with an intermediate branching, firstly the 18 nm seeds were increased in diameter, without the generation of branching. To that end, about 8 ml of 18 nm seed solution were added to 150 ml of water, together with 1 ml of 40 mM hydroxylamine sulfate. To this solution, 20 ml of 1 mM $HAuCl_4$ solution were added drop-wise, with vigorous continuous stirring, leading to an increase in the size of the seeds up to a final diameter of about 40 nm. The reaction was continued further for 30 minutes with stirring, and finally a sufficient amount of trisodium citrate solution was added in order to obtain a final concentration of 1 mM, as a mild stabilizing agent for the surface of such nanostructures. These nanoparticles were used as seeds to grow an intermediate branching. Firstly, the 40 nm seeds were concentrated by centrifuging, so as to use the same amount of seeds (in the final volume) as that used for the synthesis in Example 1. 0.8 ml of this 40 nm seed solution were diluted with the necessary amount of water, followed by addition of 0.3 ml of 40 mM $NH_2OH$ and 75 µl of 1 M HEPES solution (pH 7.0), so as to have a final volume of 25 ml. To this solution, 5 ml of 1 mM aqueous $HAuCl_4$ solution were added drop-wise, leading to a change in the color of the solution and the formation of gold nanoparticles with an intermediate branching degree, and having a maximum absorbance at about 610 nm, as confirmed by DLS, TEM, and UV-Visible spectroscopy.

What is claimed is:

1. A method of synthesizing branched gold nanoparticles by seed-mediated growth, comprising the steps of:
   a) providing a first aqueous solution of gold nanoparticle spherical seeds; and
   b) subjecting the gold nanoparticle spherical seeds to a growth treatment, characterized in that it comprises:
   $b_1$) treating the first aqueous solution of gold nanoparticle spherical seeds with a second aqueous solution comprising hydroxylamine or a salt thereof as a reducing agent and 4-(2-hydroxyethyl)-1-piperazineethanesulfonic acid (HEPES) as an agent that directs the shape of the said nanoparticles; and
   $b_2$) adding a third aqueous solution comprising aurate ions to the mixture of the first aqueous solution and the second aqueous solution as obtained in step b1), thereby obtaining branched gold nanoparticles by the controlled growth of branches on the surface of the gold nanoparticle spherical seeds.

2. The method according to claim 1, wherein the hydroxylamine salt is hydroxylamine hydrochloride or hydroxylamine sulfate.

3. The method according to claim 1, wherein the third aqueous solution of step $b_2$) comprises a gold salt.

4. The method according to claim 3, wherein the gold salt is tetrachloroauric acid ($HAuCl_4$).

5. The method according to claim 1, wherein the gold nanoparticle spherical seeds, before being subjected to the growing treatment of step b), are grown in size by a preventive treatment with a fourth HEPES-free aqueous solution of a reducing agent and subsequent addition of a fifth aqueous solution of aurate ions.

6. The method according to claim 5, wherein the reducing agent employed in the preventive treatment step is selected from the group consisting of sodium citrate, hydroxylamine or a salt thereof.

7. The method according to claim 1, wherein the final concentration of HEPES in step $b_2$) is comprised within the range of 0.1 mM to 200 mM.

8. The method according to claim 7, wherein the final concentration of HEPES in step $b_2$) is comprised within the range of 0.2 mM to 25 mM.

9. The method according to claim 1, wherein the nanoparticle spherical seeds which are subjected to the growing step b), have an average diameter comprised within the range of 10 to 100 nm.

10. The method according to claim 9, wherein the nanoparticle spherical seeds which are subjected to the growing step b), have an average diameter comprised within the range of 15 to 60 nm.

11. The method according to claim 1, wherein the pH of the second aqueous solution of step $b_1$) is comprised between 5.0 and 9.0.

* * * * *